(12) United States Patent
Kleber et al.

(10) Patent No.: US 8,408,794 B2
(45) Date of Patent: Apr. 2, 2013

(54) LINEAR BALL BEARING AND SUPPORTING RACE ELEMENT FOR THE SAME

(75) Inventors: Rainer Kleber, St. Ingbert (DE);
Thomas Winkler, Sulzbach/Neuweiler (DE); Dietmar Rudy, Kleinbundenbach (DE); Lothar Neufang, Waldmohr (DE); Peter Lutz, Kottweiler-Schwanden (DE); Anna Kania, Homburg (DE); Matthias Schmidt, Neunkirchen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 778 days.

(21) Appl. No.: 12/608,529

(22) Filed: Oct. 29, 2009

(65) Prior Publication Data
US 2010/0189381 A1   Jul. 29, 2010

(30) Foreign Application Priority Data
Oct. 30, 2008   (DE) .......................... 10 2008 053 933

(51) Int. Cl.
*F16C 29/04* (2006.01)
*F16C 29/06* (2006.01)

(52) U.S. Cl. .......................................... 384/43; 384/49

(58) Field of Classification Search ................. 384/43, 384/44, 45, 49, 50, 51; 29/898.066, 898.057, 29/898.058, 898.056; 72/414
See application file for complete search history.

(56) References Cited

U.S. PATENT DOCUMENTS

| | | | | |
|---|---|---|---|---|
| 4,952,075 A | * | 8/1990 | Rogers, III | 384/43 |
| 5,829,882 A | * | 11/1998 | Ng et al. | 384/43 |
| 6,481,892 B1 | * | 11/2002 | Agostini | 384/43 |
| 6,619,844 B1 | * | 9/2003 | Baalmann et al. | 384/43 |
| 6,908,228 B2 | * | 6/2005 | Dalessandro et al. | 384/43 |
| 2008/0107365 A1 | * | 5/2008 | Mueller | 384/44 |

* cited by examiner

*Primary Examiner* — Phillip A Johnson
(74) *Attorney, Agent, or Firm* — Lucas & Mercanti, LLP

(57) ABSTRACT

A linear ball bearing for longitudinally movable mounting of a shaft-like guide rail in a part surrounding the guide rail, which has a sleeve-like cage with recesses arranged one behind the other in the circumferential direction holding ball circuits which have at least one supporting section with supporting balls which are supported such that they can roll on the guide rail. The supporting balls are also supported such that they can roll on a raceway of a supporting race element inserted indirectly or directly into the cage. The supporting race element has at least one radial outer surface, arched outward at least in one direction, for contact against an inner surface of the part which surrounds the guide rail. The outer surface is formed by at least one web-like projection extending in the longitudinal direction of the supporting race element.

16 Claims, 5 Drawing Sheets

LINEAR BALL BEARING AND SUPPORTING RACE ELEMENT FOR THE SAME

This application claims the priority of DE 10 2008 053 933.3 filed Oct. 30, 2008, which is incorporated by reference herein.

FIELD OF THE INVENTION

The invention relates to a linear ball bearing for the longitudinally movable mounting of a shaft-like guide rail in a part which surrounds the guide rail, having a sleeve-like cage which has recesses arranged one behind the other in the circumferential direction, in which recesses are held ball circuits, with each ball circuit having at least one supporting section with supporting balls, which are supported such that they can roll on the guide rail, with the supporting balls of a ball circuit additionally being supported, such that they can roll, on a raceway of a supporting race element which is inserted indirectly or directly into the cage, which supporting race element has at least one radial outer surface, which is arched outward at least in one direction, for contact against an inner surface of the part which surrounds the guide rail.

BACKGROUND OF THE INVENTION

Linear ball bearings of said type are known for the mounting of machine parts which can move back and forth. Such machine parts include, for example, a drive spindle and a bearing housing of a machine tool. The linear ball bearings have the task of ensuring low-friction mounting in the movement direction. To ensure correct functioning at least also in the event of relatively small alignment errors between the parts which move relative to one another, it is provided in special designs that the supporting race elements of the linear ball bearings have a convexity, that is to say at least one radial outer surface, which is arched or elevated outward at least in one direction, for contact against an inner surface of the part surrounding the guide rail. In this way, the supporting race elements can move in a tilting fashion on the contact surface of the part surrounding the guide rail, and alignment errors can be substantially compensated in this way.

The production of the convexity of the supporting race elements is comparatively expensive. Said convexity is generally produced by bending the supporting race elements in the desired direction. On account of the bending which has taken place, those raceways of the supporting race element which are situated opposite the convex outer surface must subsequently be ground to obtain the desired raceway quality. Hardening of the supporting race elements is sometimes also provided.

WO 01/11251 A1 (DE 199 37 278 A1) discloses a generic linear ball bearing. Said linear ball bearing has supporting race elements which have an outer surface which is arched outward in two directions and which can therefore roll very effectively, in pivoting movements, on the bore inner surface of a machine housing which surrounds the linear ball bearing. The supporting race elements are also held in housing-like holding parts which in turn are arranged, such that they can be inserted and removed in the radial direction, in recesses of a sleeve-like cage.

DE 39 10 469 A1 describes a linear ball bearing in which supporting race elements are likewise inserted in recesses of a cage. The outer surface, which is designed for rocking contact against an inner circumferential surface of a bearing housing bore which holds the cage, of the supporting race elements slopes down in the radially inward direction in relation to the cage axis from a central region, which is situated in the region of the rocking axis of said supporting race elements, toward the ends of the supporting race elements.

DE 1 949 182 A1 also discloses a linear ball bearing in which supporting race elements, which are beveled in their longitudinal direction from the center toward the ends, are inserted into recesses of a cage. The central part of the supporting race elements forms a rotational axis and thereby enables a tilting movement, as a result of which angular errors between the parts which move relative to one another can be compensated.

DE 199 54 387 A1 likewise describes a linear ball bearing for mounting a shaft, having supporting race elements whose radial outer surfaces are of arched design such that the supporting race elements can, by tilting, adjust to dimensional tolerances of the shaft.

Finally, U.S. Pat. No. 5,558,442 is mentioned, which describes a linear ball bearing having supporting race elements which, as viewed in their longitudinal extent, have in the central region of said linear ball bearing a radial outer surface which is arched in its longitudinal direction, with the arching extending over the entire width of the supporting race elements.

The invention also relates to a supporting race element for use in a linear ball bearing and to a method for producing a supporting race element of said type, and to an embossing device for producing the supporting race element.

OBJECT OF THE INVENTION

The invention is based on the object of providing a linear ball bearing which is cost-effective to produce, has an adequate load capacity and which can adequately compensate alignment errors of the parts which move relative to one another. Furthermore, it is intended to provide a supporting race element which is cost-effective to produce and a method for producing the supporting race element and also a suitable tool for shaping a blank of the supporting race element.

SUMMARY OF THE INVENTION

The invention is based on the realization that the outer surface of the supporting race elements can be reduced without a significant decrease in the load capacity thereof, in order to thereby obtain simplifications or cost advantages in production.

The invention is therefore based initially on a linear ball bearing for the longitudinally movable mounting of a shaft-like guide rail in a part which surrounds the guide rail, having a sleeve-like cage which has recesses arranged one behind the other in the circumferential direction, in which recesses are held ball circuits, with each ball circuit having at least one supporting section with supporting balls, which are supported such that they can roll on the guide rail, with the supporting balls of a ball circuit additionally being supported, such that they can roll on a raceway of a supporting race element which is inserted indirectly or directly into the cage, which supporting race element has at least one radial outer surface, which is arched outward at least in one direction, for contact against an inner surface of the part which surrounds the guide rail. Here, according to the invention, the at least one outer surface is formed by at least one web-like projection, which extends in the longitudinal direction of the supporting race element.

It is thereby possible to produce the required convexity or arching of the outer surface of the supporting race elements by using a simplified production process (for example shaping) without a significant decrease in the load capacity of the supporting race element. By means of the web-like projection, the surface to be shaped, and therefore also the shaping forces, are reduced. Overall, therefore, it is possible for a linear ball bearing provided with such supporting race elements to be produced in a more economical and therefore more cost-effective manner.

According to a first refinement of the invention, it is provided that the web-like projection is arranged in the central region of the supporting race element, which extends axially preferably over the entire length of the supporting race element. This leads to an effective, uniform load distribution as a result of the web-like projection.

It has been found that, to ensure an adequate load distribution or transmission of force between the supporting race element and the part which surrounds the guide rail, it is expedient if the web-like projection has a width which corresponds to less than 75%, preferably 5%-35% of the width of the supporting race element.

If the spherical outer surface of the web-like projection is produced, as in the production process according to the invention, in a non-cutting process by embossing, it is highly advantageous if at least one clearance, for example a groove-like depression, is formed along the web-like projection. Ideally, in each case one such clearance or one groove-like depression should be formed at each side of the web-like projection. By means of said design, the embossing of a convex outer surface can be made considerably easier, since the clearances or groove-like depressions form a space into which the material displaced by the embossing process can be received in a controlled manner.

Furthermore, to increase the load capacity of the supporting race element, it is expedient to provide further web-like projections along both sides of the web-like projection, which web-like projections are spaced apart from one another by clearances or groove-like depressions. It is hereby nevertheless still possible to obtain a considerable reduction in the required shaping forces, with the clearances or groove-like depressions in turn forming a space for receiving the material displaced by the embossing process.

If, according to a further expedient embodiment of the invention, it is provided that the supporting race element is inserted into a housing-like holding part which in turn is inserted, preferably clipped, into the recess of the cage, it is possible for the supporting race elements to be installed, and exchanged if required, in a simple manner.

The invention is also based on a supporting race element for use in a linear ball bearing having at least one outer surface which is arched outward at least in one direction and having at least one raceway, which is situated opposite the at least one arched outer surface, for at least partially holding supporting balls of the linear ball bearing. It is provided here according to the invention that the at least one arched outer surface is formed by at least one web-like projection which extends in the longitudinal direction of the supporting race element.

As already mentioned further above, it is possible by means of said design to produce the required convexity or arching of the outer surface of the supporting race elements using a simplified production process (for example shaping) without a significant decrease in the load capacity of the supporting race element.

According to one refinement of the invention, the web-like projection is arranged in the central region of the width of the supporting race element. Here, the web-like projection may expediently have a width which corresponds to less than 75%, preferably 5%-35% of the width of the supporting race element.

Here, it is highly advantageous if at least one clearance or groove-like depression is formed along the web-like projection, that is to say preferably parallel thereto. It is optimal if one clearance or groove-like depression each is formed at each side of the web-like projection.

Furthermore, to increase the load capacity, further web-like projections may be provided along both sides of the web-like projection, which web-like projections are spaced apart from one another by clearances or groove-like depressions.

The invention also encompasses a method for producing a supporting race element, having the following method steps:
 producing a blank, preferably as a drawn profile, which has at least one web-like projection which extends in the longitudinal direction of the blank,
 embossing the at least one web-like projection in such a way that the at least one web-like projection is provided at least in its longitudinal direction with an outwardly arched outer surface.

Said production process can be carried out very cost-effectively with reduced shaping forces. As a result of said possible reduction in the required embossing force, there is no risk of the rear side of the supporting race element, in which the raceways for the supporting balls are formed, also being deformed, which would lead to the supporting race element becoming unusable, or would necessitate reworking of the supporting race element.

To be able to reduce the shaping forces as far as possible, it is expedient if the embossing force is applied only to a web-like projection arranged in the central region of the blank (again as viewed in relation to the width of the blank).

For embossing the blank, it is advantageously possible to use a device which comprises the following components: at least one embossing die which supports, in a form-fitting manner, the side which has the raceway for the supporting balls; at least two die side parts; at least two die end side parts; and at least one embossing punch which is designed, on its side facing toward the supporting race element blank, in such a way that the embossing force is applied only to the at least one web-like projection of the supporting race element blank.

BRIEF DESCRIPTION OF THE DRAWINGS

The invention is explained in more detail below on the basis of the appended drawings relating to preferred exemplary embodiments. In the drawings.

DETAILED DESCRIPTION OF THE DRAWINGS

Figure 1:
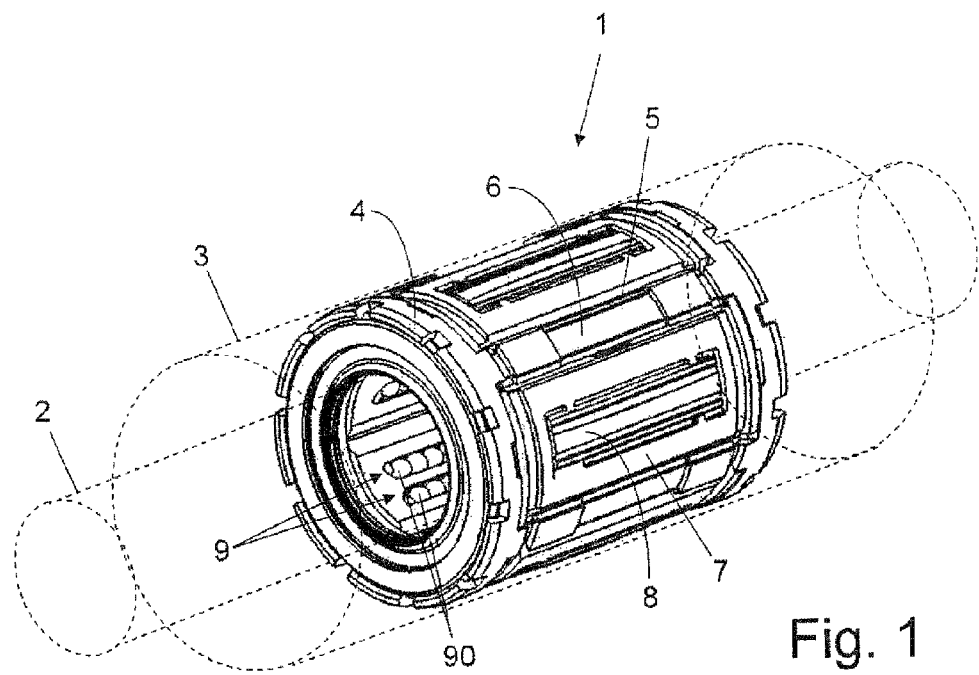
FIG. 1 shows a perspective illustration of a linear ball bearing according to the invention.

FIG. 1 illustrates a linear ball bearing 1 according to the invention. The linear ball bearing 1 serves for the movable mounting of a shaft 2 in a housing inner bore 3, which shaft 2 and housing inner bore 3 are indicated only schematically by means of dashed lines. The linear ball bearing 1 has a sleeve-like cage 4 which has recesses 5 which are spaced apart over its circumference by connecting webs 6. The recesses 5 have a rectangular outline shape and serve for releasably holding ball circuit housings 7. As can be seen, in this exemplary embodiment, the cage 4 is provided with five ball circuit housings 7, with each ball circuit housing 7 containing two ball circuits 9. Each ball circuit 9 has a supporting section with supporting balls 90, which are supported on the shaft 2 such that they can roll, a return section with balls (not visible) returning after the supporting section, and also two deflecting sections (likewise not visible) which connect said sections to one another so as to form endless circuits.

Figure 2:
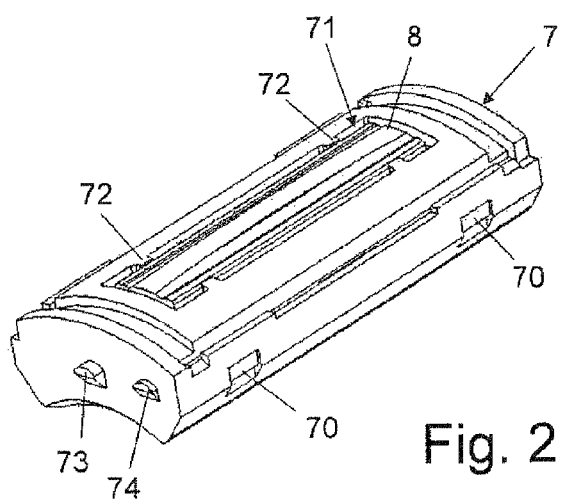
FIG. 2 shows a ball circuit housing in a perspective illustration with an inserted supporting race element according to the invention.

As shown in FIG. 2, each ball circuit housing 7 has a rectangular outline shape and, in cross-section, is arched radially outward in such a way that it can be inserted in a fitting manner into an associated recess 5 of the cage 4. Here, the ball circuit housing 7 is provided at its longitudinal sides with in each case two recesses 70 which, for example, can interact in a latching manner with corresponding latching elements (not shown) in the region of the recesses 5 of the cage 4. Furthermore, projections 73, 74 are formed on the end sides of the ball circuit housing 7, which projections 73, 74 project into corresponding openings in the region of the end sides of the recesses 5. Overall, each ball circuit housing 7 is inserted into the recess 5 and aligned in such a way as to be able to perform small tilting movements. The ball circuit housing 7 is also provided with a recess 71 which is likewise rectangular in outline and into which the supporting race element 8 can be inserted. Here, projections 72 which are formed on the longitudinal sides of the recess 71 serve as alignment aids.

Figure 3:
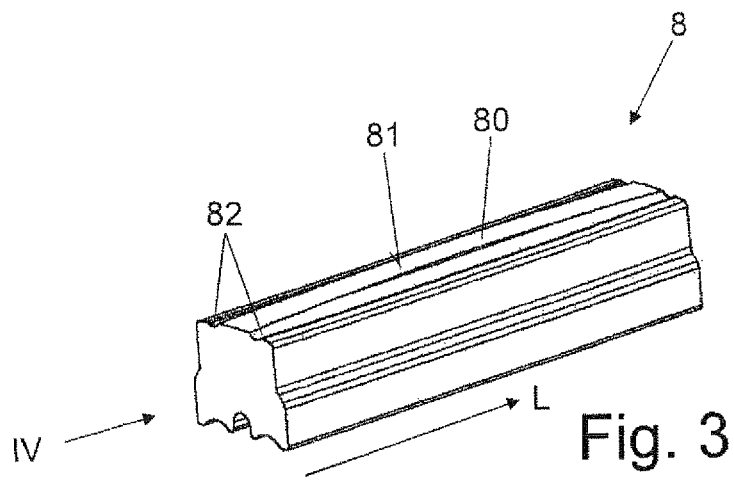
FIG. 3 shows a first design variant of a supporting race element according to the invention in a perspective illustration.
Figure 4:
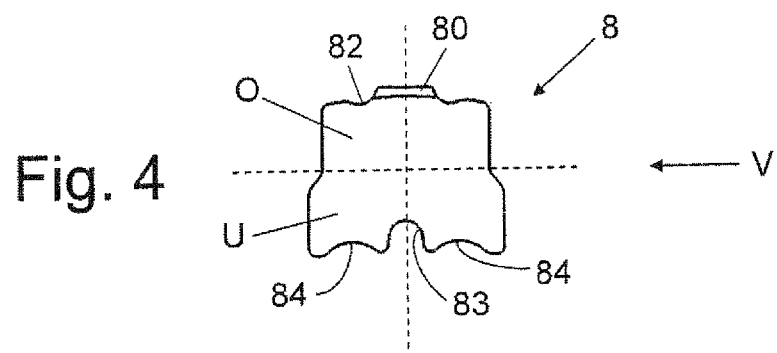
FIG. 4 shows an illustration of the supporting race element according to view IV in FIG. 3.
Figure 5:
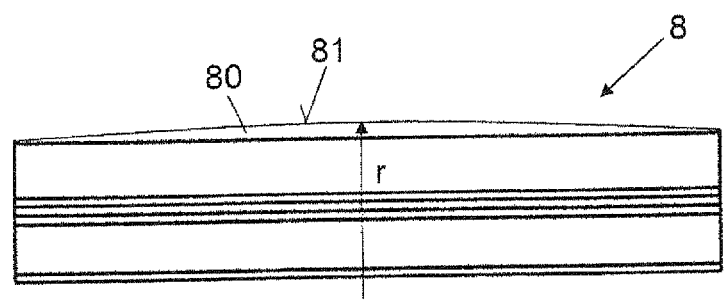
FIG. 5 shows a side view of the supporting race element according to view V in FIG. 4.

Reference is now made to FIGS. 3 to 5, which show a first exemplary embodiment for a supporting race element 8 in a plurality of views. The supporting race element 8 has the shape of an elongate block with a longitudinal extent L. Integrally formed on the upper side of the supporting race element 8, specifically in its central region in relation to its width, is a web-like projection 80 which has an outwardly arched outer surface 81 with a radius r and which extends over the entire length L of the supporting race element 8. It is pointed out that the web-like projection 80 need not necessarily be integrally formed on the upper side of the supporting race element 8 in a unipartite fashion, but may under some circumstances also, as a component or coating, be attached or joined (spot-welded, adhesively bonded, soldered etc.) thereto.

Figure 9:
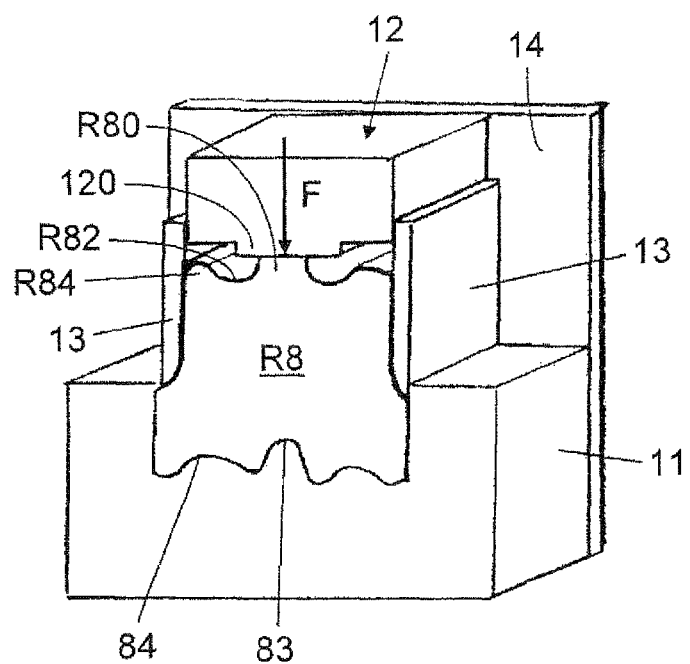
FIG. 9 shows a highly simplified schematic illustration of a production device according to the invention.
Figure 10:
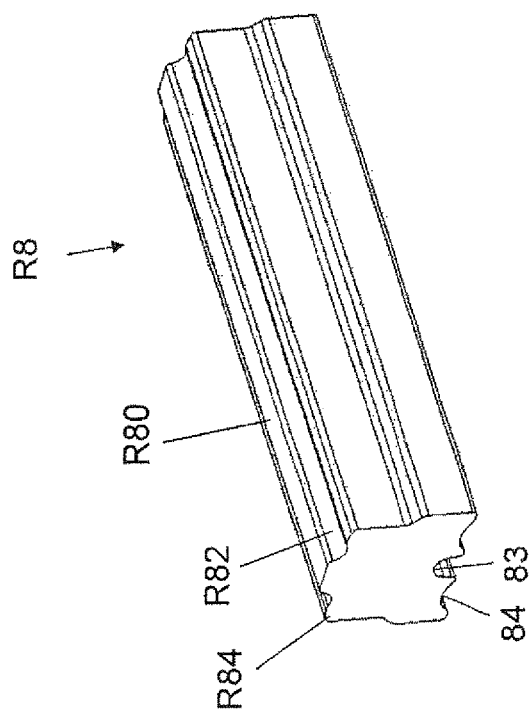
FIG. 10 shows a perspective illustration of the blank of the first embodiment of the supporting race element according to the invention before a shaping process.

Formed at both sides of the web-like projection 80 are groove-like depressions 82 which likewise extend over the entire length L of the supporting race element 8 and which are formed during a preceding embossing process (compare FIG. 9) from depressions R82 of an embossed blank R8 (compare FIG. 10). The depressions R82 form a space into which the material which is displaced during the embossing of the blank R8 can be received in a controlled fashion. It can in particular be seen from FIG. 3 that the supporting race element 8 has, in cross section, an upper half O and a lower half U, with the lower half U having a greater width and being provided centrally on its underside with a groove-like depression 83 which separates two raceways 84 for the supporting balls 90 from one another.

Figure 6:
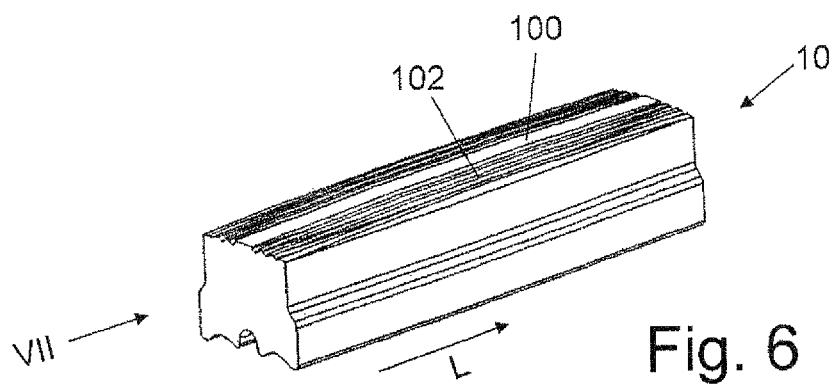
FIG. 6 shows a second embodiment of a supporting race element according to the invention in a perspective illustration.
Figure 7:
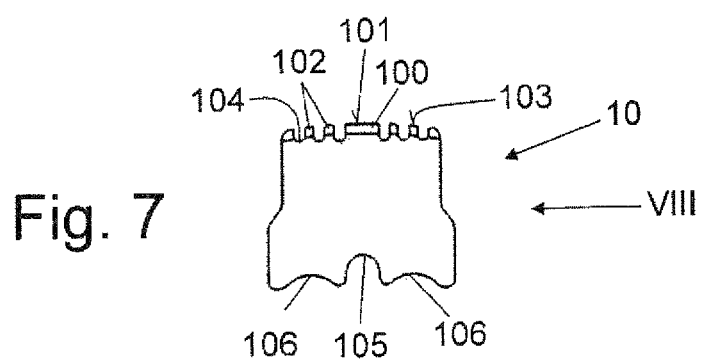
FIG. 7 shows an illustration of the supporting race element according to view VII in FIG. 6.
Figure 8:
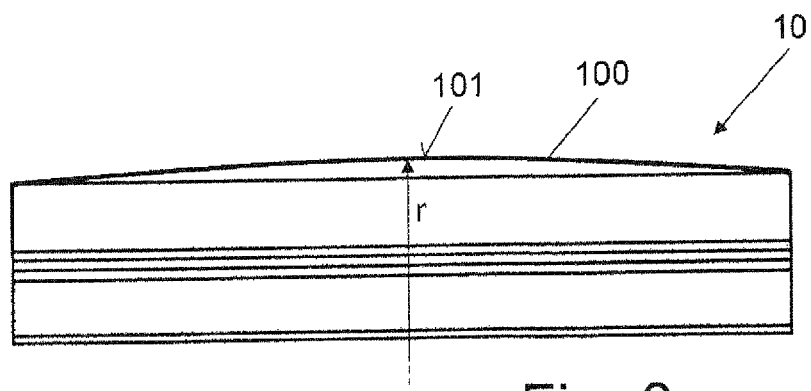
FIG. 8 shows a side view of the supporting race element according to view VIII in FIG. 7.

A second supporting race element 10 according to the invention is described with regard to FIGS. 6 to 8. The supporting race element 10 has a substantially similar shape to the supporting race element 8 already described above. However, in contrast to said supporting race element 8 and in addition to a web-like projection 100, which is situated on the upper side of the supporting race element 10 in the central region in relation to the width of the supporting race element 10 and which likewise extends over the entire length L of the supporting race element 10, further web-like projections 102 are provided at both sides of the web-like projection 100, which web-like projections 102 likewise extend over the entire length L of the supporting race element 10 and are spaced apart from one another by groove-like depressions 104. The web-like projections 100 or 102, have, in longitudinal extent L, outwardly arched outer surfaces 101 and 103 respectively with a radius r. Formed again on the underside of the supporting race element 10 are two raceways 106 which are spaced apart from one another by a groove-like depression 105.

FIG. 9 illustrates a device according to the invention for embossing a supporting race element blank R8 (see FIG. 10). The device comprises an embossing die 11 into which the supporting race element blank R8 is inserted, and supported in a form-fitting manner, with its underside. Also provided is an embossing punch 12 which applies an embossing force F to a web-like projection R80 of the supporting race element blank R8 from above. Since the regions R84 laterally adjacent to the web-like projection R80 are slightly lower than said web-like projection R80, it is easily possible for only the central region, which contains the web-like projection R80, of the blank R8 to be embossed. In this way, the surface to be shaped and therefore the embossing force F to be applied can be reduced considerably, thereby equally reducing the risk of the underside of the supporting race element blank R8, which contains the raceways 84, being deformed.

Alternatively or in addition, the embossing punch 12 may be provided with a projection 120, which approximately corresponds to the width of the web-like projection R80 or is at least slightly larger than the latter. Furthermore, the embossing punch 12 has an inwardly directed arching (not visible) which corresponds to the intended arching of the outer surface 81 of the supporting race element 8 to be produced and which extends over the entire length of the blank. Furthermore, two die side parts 13 are visible, which provide lateral hold for the embossing punch 12 and the blank R8 during the embossing process. Finally, two die end side parts 14 are also provided. Only one of said die end side parts is illustrated in order to allow the seat of the blank R8 in the embossing die 11 to be seen more clearly.

Figure 11:
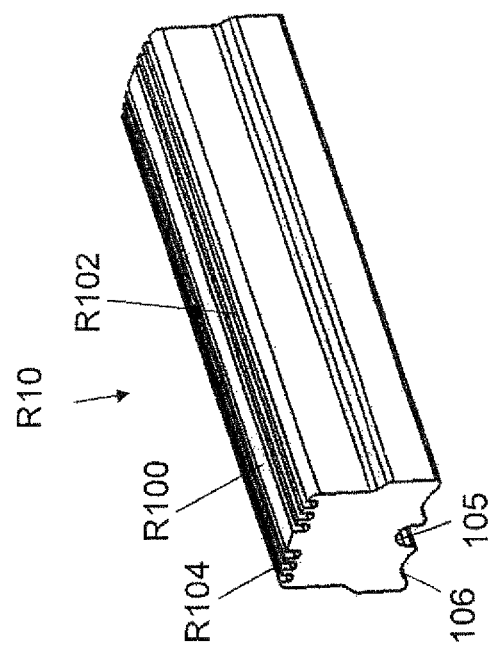
FIG. 11 shows a perspective illustration of the blank of the second embodiment of the supporting race element according to the invention before a shaping process.

Finally, FIGS. 10 and 11 illustrate the blanks R8 and R10, respectively, of the supporting race elements 8 and 10, respectively. The expression "blank" refers to supporting race elements 8, 10 before the embossing of the convex longitudinal webs. The blanks R8 and R10 are profiles which are drawn to the required dimension (length dimension) and which have, on their upper side, correspondingly profiled web-like projections R80, and R100 and R102, respectively, the surfaces of which, however, still run rectilinearly. Groove-like depressions R82 are formed between the web-like projection R80 and the lateral regions R84, which groove-like depressions R82 are shaped during the embossing process by material flow into the depressions 82. Groove-like depressions R104 are likewise formed between the web-like projections R100 and R102. On their underside, the blanks R8 or R10, respectively, already have the raceways 84 or 106, respectively, and the interposed groove-like depression 83 or 105, respectively, in finished dimensions. To produce the arched surface on the web-like projections R80, or R100 and R102, respectively, the blanks are placed into the embossing devices (for R80, see FIG. 9).

LIST OF REFERENCE SYMBOLS

1 Linear ball bearing
2 Shaft
3 Housing inner bore
4 Sleeve-like cage
5 Recesses
6 Connecting webs
7 Ball circuit housing
70 Recesses
71 Recess
72 Projections
73 Projections
74 Projections
8 Supporting race element
80 Web-like projection of the supporting race element
81 Outwardly arched outer surface of the web-like projection
82 Groove-like depressions
83 Groove-like depression
84 Raceway
9 Ball circuit
90 Supporting balls of a ball circuit
10 Supporting race element
100 Web-like projection
101 Outwardly arched outer surface of the web-like projection
102 Web-like projections
103 Outwardly arched outer surface of the web-like projections
104 Groove-like depressions
105 Groove-like depression
106 Raceways
11 Embossing die
12 Embossing punch
120 Projection of the embossing punch
13 Die side parts
14 Die end-side parts
F Embossing force
L Longitudinal extent of the supporting race element
O Upper half of the supporting race element
U Lower half of the supporting race element
R8 Blank of the supporting race element
R80 Web-like projection of the blank
R82 Groove-like depressions of the blank
R84 Regions laterally adjacent to the web-like projection R80
R10 Blank of the supporting race element
R100 Web-like projection of the blank
R102 Web-like projections of the blank
r Radius of the arched surfaces of the supporting element
S Line of symmetry of the supporting race element

The invention claimed is:

1. A linear ball bearing for a longitudinally movable mounting of a shaft-like guide rail in a part which surrounds the guide rail, comprising:
   a sleeve-like cage having recesses arranged one behind the other in a circumferential direction holding ball circuits, each ball circuit having at least one supporting section with supporting balls which are supported such that the supporting balls roll on the guide rail, the supporting balls of each ball circuit are supported such that the supporting balls roll on a raceway of a supporting race element, which is inserted indirectly or directly into the cage, the supporting race element has at least one radial outer surface for contact against an inner surface of the part which surrounds the guide rail,
   wherein the at least one radial outer surface is formed by at least one web-like projection which extends in the longitudinal direction of the supporting race element,
   wherein the supporting race element is produced from a blank as a drawn profile, which has the at least one web-like projection, and
   wherein the at least one web-like projection is embossed such that the at least one web-like projection is provided at least in the longitudinal direction with an outwardly arched outer surface.

2. The linear ball bearing of claim 1, wherein the web-like projection is arranged in a central region of the supporting race element.

3. The linear ball bearing of claim 1, wherein the at least one web-like projection has a width which is less than 75% of the width of the supporting race element.

4. The linear ball bearing of claim 1, wherein at least one clearance or one groove-like depression is formed along the at least one web-like projection.

5. The linear ball bearing of claim 1, wherein one clearance or one groove-like depression is formed at each side of the at least one web-like projection.

6. The linear ball bearing of claim 1, wherein further web-like projections are provided along both sides of the at least one web-like projection, which are spaced apart from one another by clearances or groove-like depressions.

7. The linear ball bearing of claim 1, wherein the supporting race element is inserted into a holding part which in turn is inserted into the recesses of the cage.

8. A supporting race element for use in a linear ball bearing according to claim 1, comprising:
   the at least one radial outer surface; and
   at least one raceway, which is situated opposite the at least one radial outer surface, for at least partially holding the supporting balls of the linear ball bearing,
   wherein the at least one radial outer surface is formed by at least one web-like projection which extends in the longitudinal direction of the supporting race, element.

9. The supporting race element of claim 8, wherein the at least one web-like projection is arranged in a central region of the supporting race element.

10. The supporting race element of claim 8, wherein at least one clearance or one groove-like depression is provided along the at least one web-like projection.

11. The supporting race element of claim 8, wherein one clearance or one groove-like depression is provided at each side of the at least one web-like projection.

12. The supporting race element of claim 8, wherein the at least one web-like projection has a width which is less than 75% of the width of the supporting race element.

13. The supporting race element of claim 8, wherein further web-like projections are provided along both sides of the at least one web-like projection, which are spaced apart from one another by clearances or groove-like depressions.

14. A method for producing a supporting race element having at least one radial outer surface which is arched outward at least in one direction and at least one raceway, which is situated opposite the at least one radial outer surface, for at least partially holding supporting balls of a linear ball bearing, wherein the at least one radial outer surface is formed by at last one web-like projection which extends in the longitudinal direction of the supporting race element, the method having the following method steps:

producing a blank as a drawn profile, which has the at least one web-like projection which extends in a longitudinal direction of the blank, embossing the at least one web-like projection in such a way that the at least one web-like projection is provided at least in the longitudinal direction with an outwardly arched outer surface.

15. The method for producing the supporting race element of claim 14, wherein an embossing force is applied only to a web-like projection arranged in a central region of the blank.

16. A device for shaping a blank of a supporting race element according to at least one method step of claim 15, comprising:

at least one embossing die, which supports, in a form-fitting manner, the side of the supporting race element which has the raceway for the supporting balls;

at least two die side parts;

at least two die end side parts; and at least one embossing punch which is designed, on a side facing toward the supporting race element blank, in such a way that the embossing force is applied only to the at least one web-like projection of the supporting race element blank.

* * * * *